Figure 1:
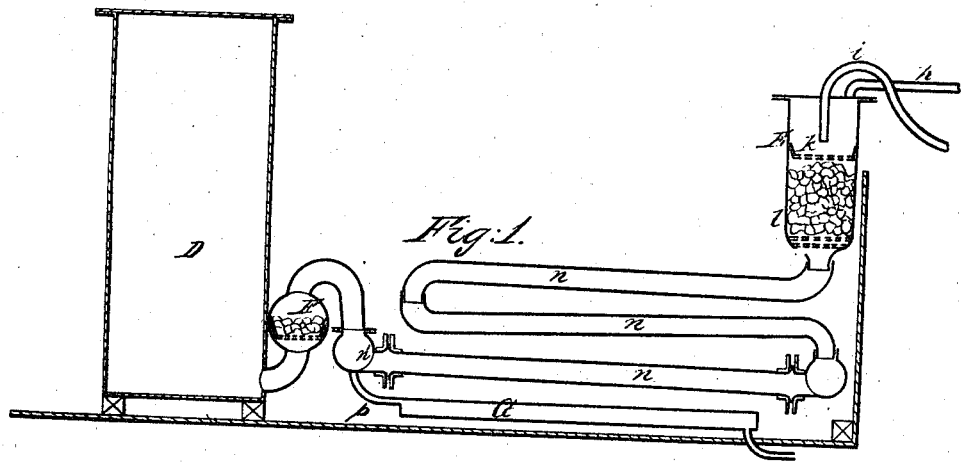

A. S. Lyman.
Preserving Meat.
N°. 91,562. Patented Jan. 22, 1869.

Witnesses: Inventor:
Azel S. Lyman.
by his Atty.

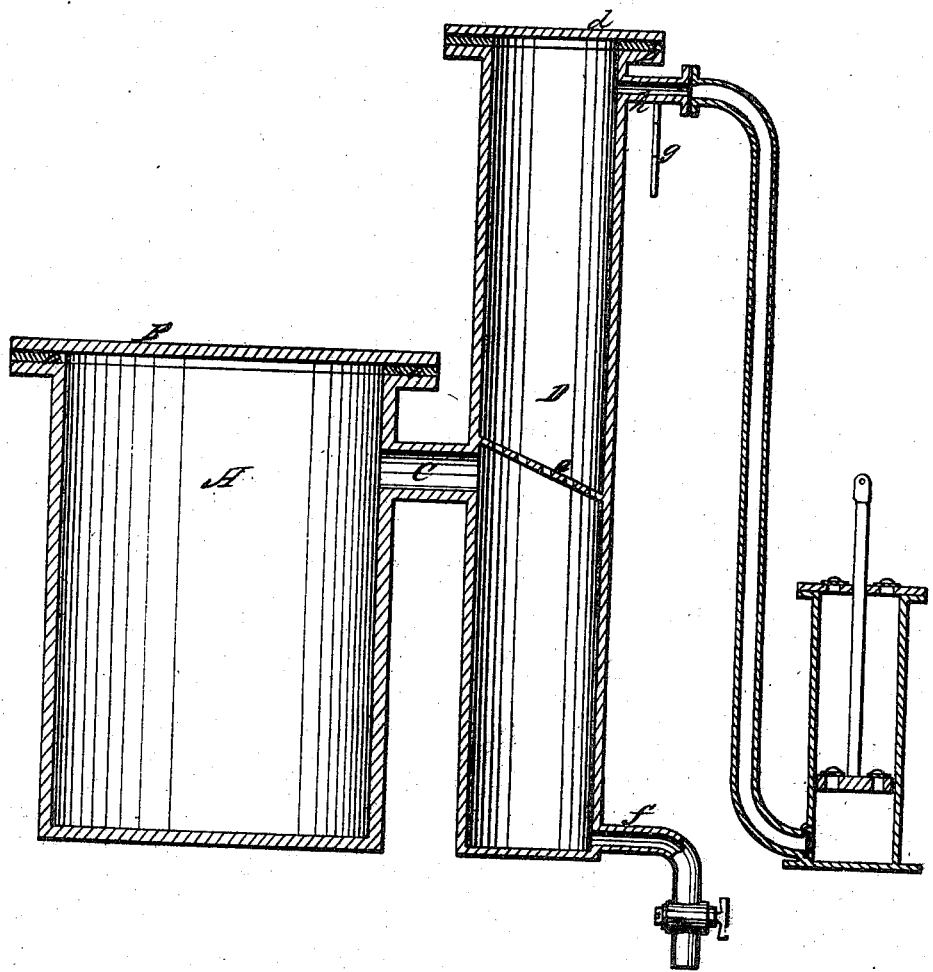

UNITED STATES PATENT OFFICE.

A. S. LYMAN, OF NEW YORK, N. Y., ASSIGNOR TO HIMSELF AND DAVID LYMAN, OF MIDDLEFIELD, CONNECTICUT.

IMPROVEMENT IN CURING AND PRESERVING MEAT, &c.

Specification forming part of Letters Patent No. 91,552, dated June 22, 1869.

*To all whom it may concern:*

Be it known that I, AZEL STORRS LYMAN, of the city, county, and State of New York, have invented a new and Improved Mode of Preparing Meat for Preservation; and I hereby declare the following to be a full, clear, and exact description of the same, reference being had to the accompanying drawings.

My invention relates, first, to an improved mode of preparing meat for preservation by removing the animal heat, the deleterious gases, and a portion of the water; and, secondly, to an improved mode of preparing and preserving roast meat in a condensed or concentrated form.

The flesh of all animals, when recently killed, contains more or less of the decomposing products of the normal waste. It is the escape of these impurities, composed principally of ammonia and other compounds of hydrogen, which gives to recently-dressed beef, mutton, &c., their peculiar rank, offensive smell. These decomposing matters act as a ferment or leaven in the fluids of the meat, and cause the commencement of the process of decomposition almost immediately, provided the meat is shut up as soon as dressed, so that the decomposing matters cannot escape.

When heavy beef or pork is killed in very cold weather, and allowed to freeze at once, the pores on the surface contract, and are closed against the escape of these impurities, which, as they do not freeze as readily as water, are driven to the center of the meat, where, being concentrated, they act as a powerful leaven, so that the meat is found to be very offensive in its thickest part, notwithstanding its frozen state, and to be tainted as soon as thawed.

When meat is dressed and allowed to remain in very damp, impure air, these impurities escape but slowly, and the meat consequently remains sweet but a very short time.

My object is to remove these impurities from the meat as soon as possible; and to this end my improvement consists in placing the meat in a vacuum so perfect that water will boil at a temperature below blood-heat, when these products, boiling at a lower temperature than water, are distilled from the fluids of the meat, much as alcohol would be under the same circumstances. But just as alcohol has a chemical affinity for water, so that considerable water escapes within the still, so ammonia has a strong chemical affinity for water, and a large per centum of water is evaporated with it; and before the ammonia and other matters are all evaporated from the center of the meat the water near the surface has evaporated until the meat is cooled from about blood-heat down to 36° or 40° temperature by this evaporation, and has lost from four to six per centum of its weight.

It would be impracticable, if not utterly impossible, to remove these vapors by the vacuum-pump alone, for two reasons: first, on account of their enormously-increased volume at that low pressure; second, because, when the piston comes down upon them, they condense in the cylinder of the pump instead of being forced out against the pressure of the atmosphere, and, when the piston rises again, they flash into vapor and fill the pump, so that the pump ceases to withdraw either air or vapor from the vacuum-chamber.

These difficulties I have completely remedied by the introduction of a suitable condenser or absorbent between the meat or vacuum chamber. For this condenser I have sometimes used a reservoir of fragments of ice. On these fragments the ammonia and some other impurities, together with the vapor of water, are condensed, while the air only passes on into the pump. This pump, which may be of any ordinary or suitable construction, should be so perfect as that when drawing off the air through ice the meat will be cooled from blood-heat down to 36° or 40° by its own evaporation within from five to ten minutes. It will be found to have shrunk in weight from four to six per centum during this time. This four or six per centum has been condensed upon the ice.

Sheet 1 of the accompanying drawings represents an apparatus of the kind referred to.

The pipe C connects the meat or vacuum chamber A with the condenser D, in which the ice is held on a grating, *e*. A pipe, *f*, at the bottom, serves to draw off the matters which gather there, and a tube, *h*, at the top, connects the condenser with the pump.

In place of ice in the condenser I sometimes use other condensing or absorbent substances, such as sulphuric acid. This can be effectively used by saturating pumice-stone with the acid, and then pumping through it, and in various other ways.

In Sheet 2 I have represented a diagram of an apparatus which can be advantageously used in this connection.

Figure 2:
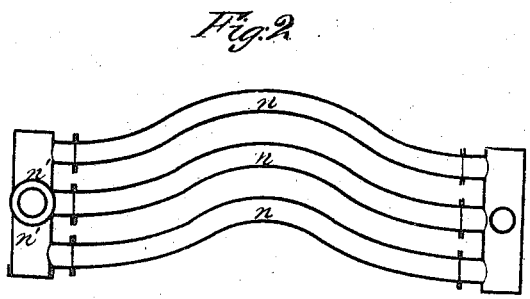

The vacuum-chamber is represented at D, while the pipe leading to the exhaust-pump is shown at $h$. This pipe opens into a receptacle, E, which is also entered by another pipe, $i$, leading from the sulphuric-acid reservoir. The acid, passing from the pipe in a determinate quantity, drops through a diaphragm, $k$, and percolates through a mass of pumice-stone or coke, $l$, which rests upon a grating in the receptacle E. The lower end of the receptacle connects with a coil of tubing, $n$, each bent or fold of which dips or slants somewhat, so as to retain a sufficient quantity of the acid, which flows slowly through the coil. The bottom portion of the coil consists, in this instance, of three pipes, (seen in plan, Fig. 2,) which have the bent or curved form there shown, in order to admit of the contraction and expansion consequent upon the heating and cooling of the apparatus taking place laterally and without deranging or damaging the parts of the apparatus.

The lower part of the coil connects with a filter, F, filled with caustic lime or its equivalent, for the purpose of taking up the offensive gaseous and other matters drawn from the meat in the vacuum-chamber D, with which the filter is connected in the manner represented.

The box $n'$, which unites the ends of the three tubes forming the lower portion of the coil, is provided with a pipe, $p$, which leads into a reservoir, G, and conducts there the dilute acid passing from the coil. The acid is thence drawn off from time to time and concentrated, so that it can be again used.

These apparatus are given in illustration of my invention; but it is obvious that many other forms of apparatus can be devised to effect the same result—viz., the condensation or absorption of the vapor before it reaches the vacuum-pump.

The mode of operation is as follows: Immediately after the animal is dressed, while yet warm and throbbing, and before the pores have shrunk, let it down into the vacuum-chamber and exhaust the air until the mercury in the vacuum-gage has fallen to within about a fourth of an inch of the level, under which pressure water boils at about 38° temperature. If the meat is in large masses, let it remain at this pressure about eight or ten minutes, when it will be found to have cooled by its own evaporation down to about that temperature.

In case the meat is to be cut up before being sold, it is best to do this before placing it in vacuum, and as quickly as possible, so that the ammonia, &c., can escape more rapidly.

I can also cut some parts of the beef or other meat into suitable size for cooking, and warm it to 100°, or even 120°, Fahrenheit, and then introduce it into the vacuum-chamber and cool it by rapid evaporation, as above described.

If the vacuum is formed too suddenly, the juices of the meat are driven out by the gases and vapors escaping, and hence it is better to form the vacuum in not less than two or three minutes, or a longer time with whole hogs or quarters of beef.

It is found in practice that by this method the rank vapors are removed, so that the meat tastes as sweet after it has been but a few moments in the vacuum, though killed but a short time before, as it does after being hung for many days in the open air without having been in the vacuum.

In some hot climates it is impossible, by ordinary means, to remove the heat and vapors from the meat soon enough to prevent decomposition, and in time for salt and other antiseptics to preserve; but by my process I am enabled to remove the gases and the heat so quickly that the meat can be readily and effectively preserved by such agencies.

The process above described also renders it practicable and easy to pack fresh meat in cans or other receptacles for preservation and transportation. For this purpose I pack the fresh meat in cans or other suitable receptacles, and place the same in the meat or vacuum chamber, and then exhaust the air, as described. After the completion of this operation I supply the place of the air with nitrogen and carbonic-oxide or other innoxious gas, which is introduced into the vacuum-chamber by means of suitable apparatus. After the requisite quantity of gas has been introduced I seal the cans by suitable means while still in the vacuum-chamber, and they are then prepared and ready for use.

The second portion of my invention, as hereinbefore specified, relates to a new and improved mode of preparing and preserving roast meat in a condensed or concentrated form.

By the ordinary mode of preserving meat in cans it is stewed, or boiled, or roasted, the pieces packed in cans, and the interstices filled with the gravy or juices of the meat, or with water, so as to displace the air from the vacant spaces. It is then heated to about 212° to expel the air that is left, then soldered, or again heated to convert any free oxygen that may be left into carbonic acid, which is innoxious.

My improved condensed roast meat differs from the above in its preparation as follows: Having deprived the meat of a large per cent. of its water, the juices being concentrated in it, and the meat at the same time roasted by means of a current of dry warm air, which passes from the heater through the meat-chamber and off into the outer atmosphere, carrying the moisture with it, I grind or otherwise reduce the roughest parts to about the consistency of thick mortar or putty, and then pack the best pieces in this reduced meat, and press it all into a compact mass in the can, the interstices being filled with the reduced meat firmly pressed in, so as to expel the air, instead of filling them with the gravy or with water, as by the common modes. Sometimes I grind the whole of the meat and pack the can with it, compressing it into a solid mass, then heat and seal it up from the air, and reheat it to combine any free oxygen that may possibly be left in the can.

In the preparation of the meat preliminary to packing it in cans, it should be deprived of the hereinbefore-mentioned products of the normal waste. While the pump and condenser are valuable in thus preparing this product, it can, however, be prepared by the usual means of evaporating the liquid from the meat in temperate climates.

When the meat is thus prepared I place it in an oven, where it is both roasted and dried by means of a current of heated air, which is let in from below, passes upward through the meat, and thence directly off into the outer atmosphere.

The current of hot air is induced by forcing the previously-heated air through the oven by means of a fan or equivalent means, for causing a constant circulation of the warm dry air through the meat with such force and in such quantity as may be desired.

The flue or flues through which the heated air passes to the oven should be provided with a filter of lime, charcoal, or other absorbent, for the purpose of purifying the air previous to its admission into contact with the meat, and the same flue or flues should be provided with screens, of cloth or other suitable material, to exclude dust and other mechanical impurities.

The meat, as the cooking progresses, passes downward in the oven, and fresh meat is put in, so that the drip from that which is but partially cooked will fall upon that which has been longer in, and will keep the latter thus bathed until the juices are concentrated in the meat.

When the operation is completed the whole or a part of the meat, as before specified, is ground or otherwise reduced, packed in air-tight cans or other receptacles, and sealed up.

Beef, mutton, fish, or other meat can readily be treated in this manner.

By this mode I have produced a new product readily distinguished from, and, in some respects, superior to, any other form of canned meat. It certainly remains sweet several times longer after the can is opened than when the juices of the meat, instead of being condensed in it, are left in a fluid state, and turned in to exclude the air from insterstices. It requires less than one-half as many cans as the ordinary mode.

Having now described my invention, and the manner in which the same is or may be carried into effect, what I claim, and desire to secure by Letters Patent, is—

1. The method of preparing meat for preservation by placing it in a vacuum-chamber while yet warm, and exhausting the air from said chamber, substantially as described, and keeping the meat in such vacuum until properly cooled, all substantially as set forth.

2. The combination, with the meat-chamber and pump, of a condenser or absorbent located between said pump and chamber, operating substantially as and for the purposes set forth.

3. As a new manufacture, fresh meat prepared substantially as herein specified—that is to say, fresh meat that has been placed in a vacuum so perfect that water will boil in it below blood-heat, and has there been deprived of its ammonia and some other products of the normal waste, substantially as and for the purposes specified.

4. As a new article of merchandise, fresh meat treated as herein described, and packed in cans or other suitable receptacles, and then introduced into a vacuum-chamber, the air exhausted, and its place supplied with nitrogen and carbonic-oxide or other innoxious gas, and the receptacle closed while in the vacuum-chamber, in the manner and for the purposes substantially as specified.

5. Removing the products of the normal waste, roasting, and drying the meat, as herein specified, grinding or otherwise reducing it, or a part of it, and finally sealing it up in air-tight cans, substantially as and for the purposes described.

6. As a new manufacture, concentrated roast-beef, mutton, fish, or other meat, prepared and preserved substantially as specified.

7. Preserving meat by roasting and drying it at one and the same time, such roasting and drying being effected by passing a current of warm air through the meat, substantially as set forth.

AZEL STORRS LYMAN.

Witnesses:
H. V. HOAGLAND,
W. T. LYMAN.